United States Patent [19]

Flick

[11] 4,117,358
[45] Sep. 26, 1978

[54] COMBINED ELECTRICAL AND COOLANT DISTRIBUTION SYSTEM FOR DYNAMOELECTRIC MACHINES HAVING INTERNALLY COOLED STATOR WINDINGS

[75] Inventor: Carl Flick, Pittsburgh, Pa.

[73] Assignee: Westinghouse Electric Corp., Pittsburgh, Pa.

[21] Appl. No.: 748,245

[22] Filed: Dec. 6, 1976

[51] Int. Cl.² .............................................. H02K 9/08
[52] U.S. Cl. ...................................... 310/59; 310/64; 310/260
[58] Field of Search ....................... 310/52, 10, 40, 54, 310/260, 57, 58, 64, 59, 60, 65, 198–208, 179, 180, 184

[56] References Cited

U.S. PATENT DOCUMENTS

| | | | |
|---|---|---|---|
| 2,828,428 | 3/1958 | Baudry | 310/64 |
| 3,112,415 | 11/1963 | Bahn | 310/54 |
| 3,614,493 | 10/1971 | Collings | 310/54 |
| 3,634,705 | 1/1972 | Fidei | 310/57 |
| 3,753,013 | 8/1973 | Beermann | 310/54 |
| 3,975,655 | 8/1976 | Beermann | 310/260 |
| 4,029,978 | 6/1977 | Jager | 310/64 |

Primary Examiner—R. Skudy
Attorney, Agent, or Firm—J. W. Keen

[57] ABSTRACT

A dynamoelectric machine having a stator portion with internally cooled windings disposed therein which are electrically and hydraulically connected to a system of conduits each of which conducts both electricity and coolant. The system of conduits provides electrical and coolant communication to the terminating portions of the windings and supplies coolant to intermediate end turn portions of the windings. Each conduit branches at one end into several members, one of which becomes a phase lead when electrically connected to a terminating portion of a winding while the remaining members conduct coolant in an electrically insulated manner to the winding's terminating and end turn portions.

7 Claims, 8 Drawing Figures

COMBINED ELECTRICAL AND COOLANT DISTRIBUTION SYSTEM FOR DYNAMOELECTRIC MACHINES HAVING INTERNALLY COOLED STATOR WINDINGS

BACKGROUND OF THE INVENTION

This invention relates to dynamoelectric machines which have stator members with multi-looped coils disposed therein constituting stator windings, and more particularly to a combined electrical and coolant distribution system for the stator windings.

In the past, separate distribution systems have been used for supplying coolant to the stator windings and obtaining electricity from the same. The coolant supply system frequently consisted of circular manifolds in fluid communication with the stator windings in an electrically insulated manner with one manifold being located at each axial end of the stator windings while the electrical distribution system consisted of parallel, arcuate connector rings which were electrically connected at one end to the terminating portions of the stator windings and at their other end provided phase lead extensions. Previous systems thus had the following adverse consequences: (1) a separate cooling circuit for the phase connections was required; (2) coolant manifold components were arranged to fit into a connection zone of the stator windings when that zone was already crowded by the presence of phase connections; (3) accessibility for maintenance on the parallel, arcuate rings, stator coil supports, and core end portions was very limited; (4) limitations on the methods and equipment for over-potential testing of the stator windings were imposed; and (5) the use of special parts for the distribution of coolant to the end turns such as long hose connections capable of withstanding all voltages from stator winding potential to ground for all intended operating and testing conditions were required.

U.S. Pat. No. 3,112,415 by Bahn et al. utilizes the arcuate rings and phase leads as a coolant conduit, but retains a separate coolant inlet manifold with the accompanying disadvantages which are inherent in its use. U.S. Pat. Nos. 3,634,705 by Fidei and 3,614,493 by Collings also teach hydraulic and electric connecting means for the stator windings, but neither uses the arcuate connection rings for both functions or eliminates the coolant supply manifold.

Superconducting generators and other dynamoelectric machines which use air gap stator windings have the potential for generating power at considerably higher voltage levels than has been the practice with generators of more conventional design. Such windings must be supported and braced to withstand relatively higher force levels than presently exist for windings contained in conventional stator slots. Air gap stator windings used in superconducting generators (e.g., with superconducting rotor field windings) can have higher voltage levels which will be accompanied by more individual coil connections for each stator winding than now exist. The problem of making coolant connections from coolant manifolds at ground potential, which is a common present practice, through hoses which are long enough to provide sufficient electrical insulation to withstand the higher voltage levels and numerous enough for the increased number of coils in each winding will be a very formidable one.

SUMMARY OF THE INVENTION

In general, a dynamoelectric machine made in accordance with this invention comprises a stator, a plurality of coils disposed in the stator constituting stator windings with each of the windings having terminating portions and end turn portions disposed intermediate to the terminating portions, and a conduit means for supplying electrical and coolant flow to the terminating portions of said stator windings and for providing electrically insulated coolant routes to the end turn portions.

By combining the functions of coolant distribution and electrical connection of the stator windings or phase groups into one set of components, the following advantages are obtained: (1) coolant distribution manifolds at ground potential and hose connections from them to the end turns can be eliminated; (2) crowding is reduced in the zone partially occupied by parallel, arcuate, phase lead rings which are connected to the windings' terminating portions; (3) access to the parallel, arcuate, phase lead rings, coil supports, and stator ends is improved; (4) testing of the stator windings is facilitated since a large number of the hose connections from ground potential to winding potential has been eliminated; (5) total length of insulating hose required to electrically isolate the stator windings from the coolant manifold is substantially reduced; (6) the phase leads are intensively cooled without using separate cooling circuits; (7) a dynamoelectric machine design is obtained which is more compatible with the requirements of superconducting armature windings in that their support and integrity as structures of conducting, insulating, and bracing materials is promoted; and (8) improved compatibility with coolant other than highly purified water is obtained due to the substantial reduction in dielectric stress that is realized by this system.

Thus, in normal operation, this invention's dual purpose arcuate rings operate at the voltage of the particular phase group or stator winding to which they are connected. Consequently, the coolant connections from the phase lead arcuate rings to the individual winding end turns need only sufficient electrical insulation to withstand the local voltage stress between the phase leads and the coil in that phase group which is at the greatest potential difference from them. In the worst case, this is line-to-line voltage, but more usually, namely in parallel or series wye windings, this maximum potential difference will be limited to less than 60% of line-to-line voltage. This compares favorably to the application of two times line-to-line voltage plus 1000 volts to each individual hose connection during the factory high potential test. During testing, the major advantage of this invention is that the hose connections to the individual winding end turns are not exposed to any dielectric stress, since under test conditions the phase leads operate at the same potential as do the windings themselves. All that is necessary in preparation for the high potential test or other testing at elevated potentials, is to break the connection between the phase lead rings and the coolant supply which must be maintained at ground potential. Unlike present practice, this invention renders it unnecessary to drain and purge the coolant from the winding for high potential tests when using a D.C. test unit.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
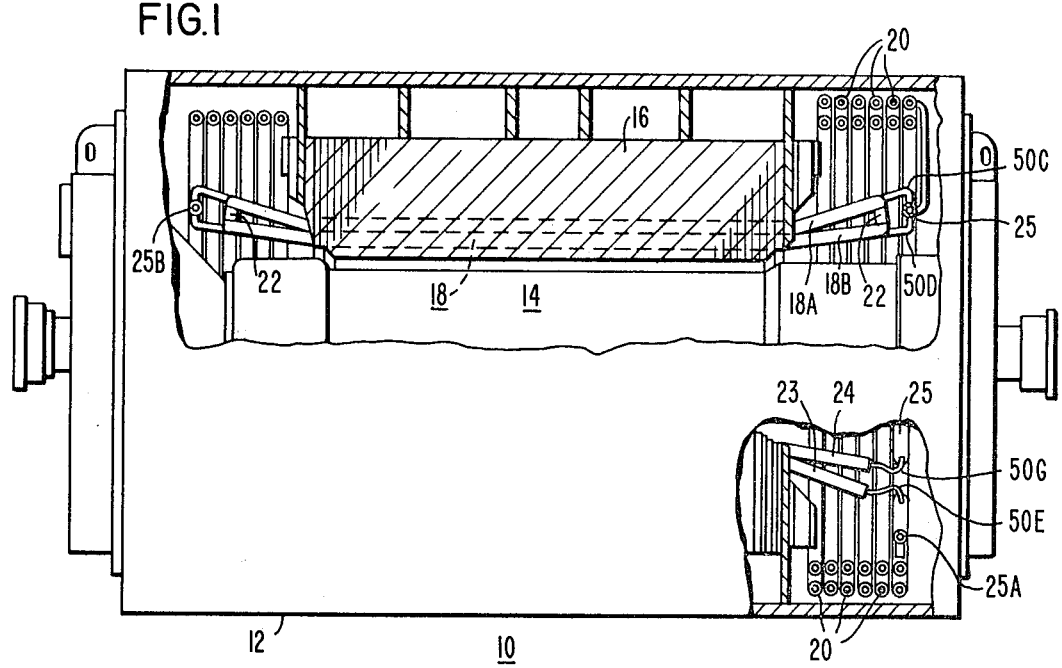
FIG. 1 is a partial sectional view of a three-phase generator made in accordance with this invention.

Referring now to the drawings in detail, FIG. 1 shows a partial sectional view of a three-phase generator 10 having an outer casing 12, a rotor 14, and a stator 16 which has coils 18 disposed therein constituting the stator windings.

Top or radially inner half coil 18A and bottom or radially outer half coil 18B extend into the end region of stator 16 where they are circumferentially bent in opposite directions and are formed with a complex curvature to lie along a frustoconical surface. At most locations in the stator's end region they are electrically connected at a series loop with other half coils to form complete coils and provide connections which have radially inner half coils in electrical contact with radially outer half coils. These complete coils may be further connected serially to form stator phase windings or stator split-phase windings. Each arcuate connector ring 20 terminates on an inlet arcuate header 25A which is disposed radially nearer said rotor 14 than is said arcuate connector ring 20, with header 25A being hydraulically connected to half coils 18A and 18B near the series loop or end turn 22 providing coolant thereto. However, at circumferentially displaced locations around the stator, the winding terminating portions 23 and 24 are electrically and hydraulically connected through inlet arcuate headers 25A to separate arcuate connector rings 20 so that those connector rings 20 can act as phase leads and provide coolant to the winding terminating portions 23 and 24. Heat laden coolant exists from the half coils, passes through exit arcuate headers 25B, is externally cooled, and returned to the hollow, arcuate connector rings 20. While winding terminating portions 23 and 24 are shown as being radially adjacent, it is to be understood that these half coils have been circumferentially rotated from their actual positions into the plane of FIG. 1. For the illustrated generator 10, twelve arcuate connector rings are required since they function as phase leads for the three, split-phase embodiment shown in FIG. 1.

Figure 2A:
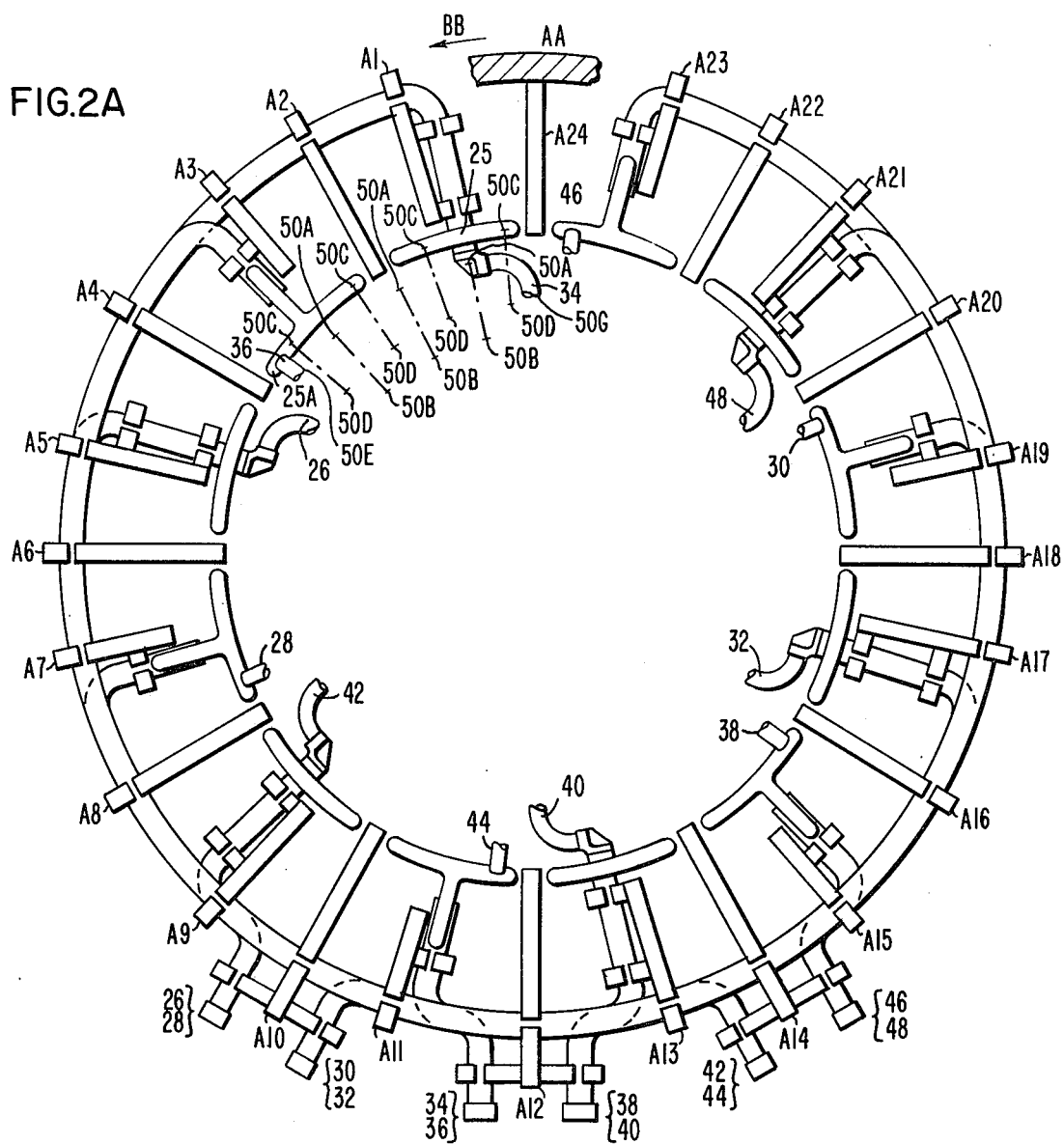
FIG. 2A is an end view of the cooling and electrical distribution scheme shown in FIG. 1.
Figure 2B:
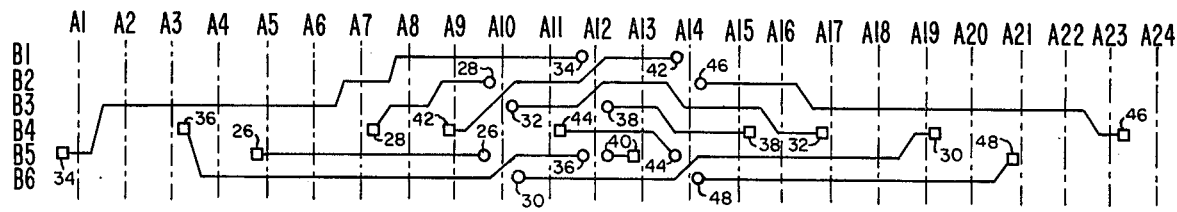
FIG. 2B is a circumferential development of FIG. 2A's cooling and electrical distribution scheme.

FIG. 2A is an elevation view of the generator 10 shown in FIG. 1. FIG. 2A, however, illustrates only one example of this invention's deployment about the stator. Although this embodiment has 12 phase leads labeled as 26, 28, 30, 32, 34, 36, 38, 40, 42, 44, 46, and 48, FIG. 2B shows that at any radial location about the stator a maximum of six arcuate connector rings 20, which function as phase lead-coolant conduit combinations, are actually axially adjacent to each other. FIG. 2B is a developed view of FIG. 2A when FIG. 2A is "unrolled" beginning at position AA and extending in the direction of arrow BB. Relative axial and circumferential positions of the phase lead-coolant conduit combination with their terminating and connection ends are illustrated in FIG. 2B as having a brace number location as shown in FIG. 2A and having a bank number location which shows relative axial positioning of the phase lead-coolant conduit combinations. Brace numbers begin with A1 shown in FIG. 2A and continue counterclockwise in FIG. 2A to a maximum of A24 while the bank numbers range from B1 through B6. One winding arrangement for generator 10 would have phase lead arcuate ring extension 36 supplying electrical and coolant communication to a winding's first terminating portion 23 (shown in FIG. 1) while supplying coolant communication to approximately one-half the winding's end turn portions 22 of coils 18. The remaining end turn portions 22 of that winding are provided with coolant from phase lead 34 which also supplies both electrical and coolant communication to the other winding's terminating portion 24. Phase leads 34 and 36 define the ends of connected coils 18 which constitute one phase group or winding of generator 10. By using phase leads 34 and 36 to each supply approximately one-half the coolant to the winding situated therebetween, the phase leads' insulated outer dimensions can be held to a size of 2.25 inches OD for a three-phase 300 MVA generator which compares favorably with the present single function, separately cooled arcuate connector rings' OD of 2.65 inches. This arrangement of electrical and coolant conduits is illustrated in FIG. 2A by the relative positioning of Teflon hoses 50A, 50B, 50C, 50D, 50E, and 50G with the arrangement pattern being repeated approximately every 60° about the circumference of the generator in order to service each split phase winding.

Figure 3A:
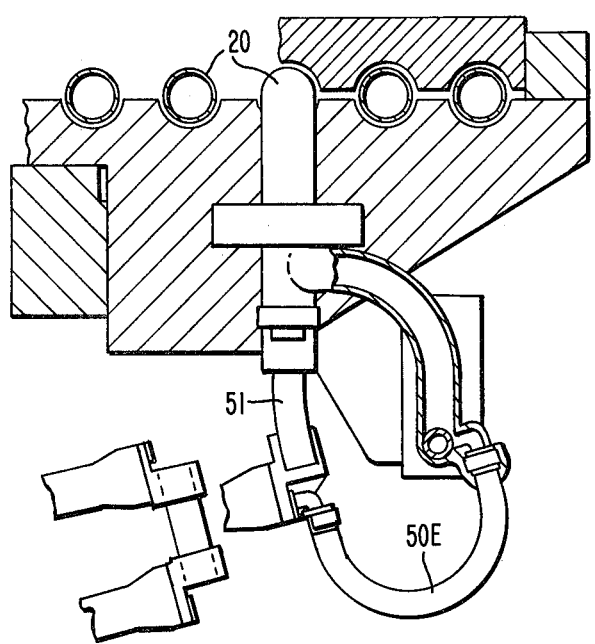
FIGS. 3A, 3B, 3C, and 3D are orthogonal views of hose connections which are illustrated in FIG. 2A.
Figure 3B:
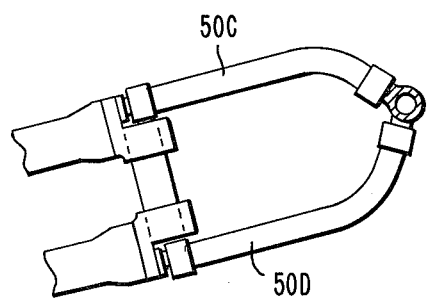
Figure 3C:
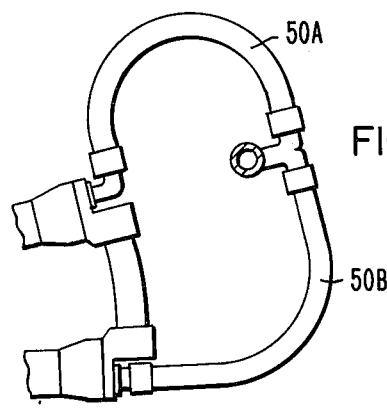
Figure 3D:
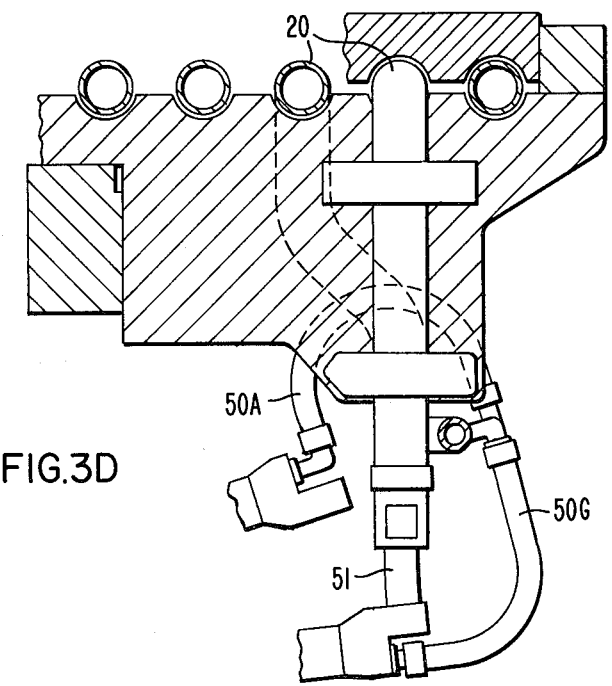

FIGS. 3A, 3B, 3C, and 3D illustrate in detail an example of phase lead-coolant conduit connections to the winding terminating portions 23 and 24 exemplified by hoses 50E and 50G and the coolant connection to end turn portions 22 exemplified by hoses 50A, 50B, 50C, and 50D. Although electrical conductors 51 are shown in FIGS. 3A and 3D as providing the electrical connection between the arcuate connector rings 20 and a winding's terminating portions, the electrical connection and coolant conduit could also be combined into a single component having electrical and coolant transmitting capability. FIGS. 3A and 3D also illustrate five arcuate phase lead-coolant conduits previously mentioned as being axially adjacent to each other at any radial location about the stator for one configuration of this invention. While six is the maximum number of conduits, all perepheral locations other than one have a maximum of five. Teflon hoses are used for all coolant connections made from the arcuate headers 25A and 25B to the stator windings due to their excellent mechanical and electrical insulating characteristics.

Figure 4:
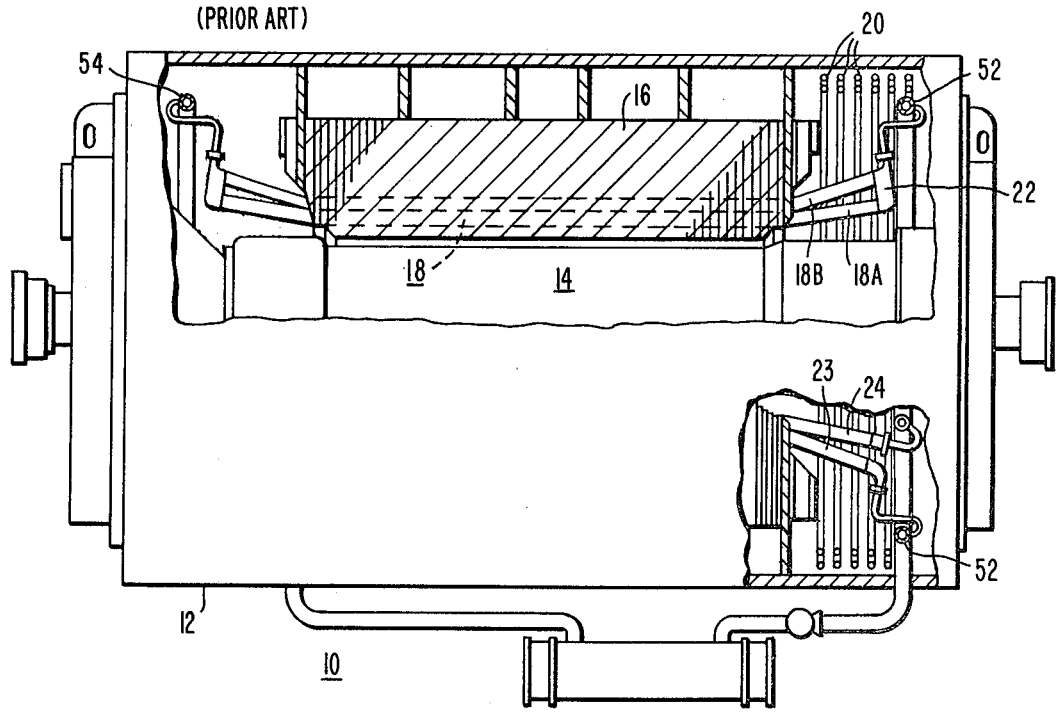
FIG. 4 is a partial sectional view of a three-phase generator utilizing the prior art of parallel, arcuate phase lead rings and coolant manifolds used to supply coolant to and remove heat laden coolant from the various stator windings.

FIG. 4 is a partial sectional view which illustrates the prior art practice of using arcuate connector rings 20 to electrically connect phase lead bushings (not shown) which are attached to outer casing 12 to the winding's terminating portions 23 and 24 and using a separate coolant supply manifold 52 to provide coolant to the end turn portions 22 and to the winding's terminating portions 23 and 24. Heat laden coolant exits from the coils 18 through coolant discharge manifold 54 after that coolant has passed at least once through the generator. It has also been common practice to cool phase lead bushings with an additional coolant circuit which is not shown.

Although the invention has been shown as part of a single direction coolant flow, three phase generator, it is to be understood that the invention may be a part of any dynamoelectric machine utilizing a liquid or gas cooling medium.

I claim as my invention:

1. A dynamoelectric machine comprising:

a stator portion having a core member with a plurality of coils constituting stator windings disposed in said core, said windings having terminating portions with end turn portions disposed intermediate thereto at the ends of said core member, said windings comprising a plurality of electrical conductors and at least one cooling passage capable of passing coolant therethrough; and a plurality of hollow, electrical conductors, each of which constitutes a phase lead and each of which branches at a first end into a plurality of conduit members wherein one of said conduit members is electrically and hydraulically connected to one of said windings' terminating portions while the remaining conduit members of each plurality are electrically insulated from and hydraulically connected to at least one of said end turn portions.

2. The dynamoelectric machine of claim 1, wherein said hollow, electrical conductors are electrically insulated from each other.

3. The dynamoelectric machine of claim 1, wherein said hollow, electrical conductors are disposed about said stator windings in arcuate ring portions of varying arc lengths with said hollow, electrical conductors each having a second end disposed at the periphery of said dynamoelectric machine to facilitate electrical and coolant connections thereto.

4. The dynamoelectric machine of claim 3, wherein said arcuate ring portions are disposed axially adjacent to each other at one end of said core member with said hollow, electrical conductors axially traversing varying distances between said arcuate ring portions and said second ends.

5. The dynamoelectric machine of claim 1, further comprising:

a plurality of coolant discharge conduits in fluid communication with and electrically insulated from said windings, each of said conduits being in fluid communication with one winding.

6. A dynamoelectric machine comprising:

a stator portion having a core member with a plurality of coils constituting stator windings disposed in said core, said windings having terminating portions with end turn portions disposed intermediate thereto at the ends of said core member, said windings comprising a plurality of electrical conductors and at least one cooling passage capable of passing coolant therethrough; and a plurality of hollow, electrical conductors, each of which constitutes a phase lead and each of which branches at a first end into a plurality of conduit members and at least one electrical conductor, wherein said conduit members are electrically insulated from and hydraulically connected to one of said winding's terminating portions and at least one of said end turn portions while said electrical conductor is electrically connected to one of said windings' terminating portions.

7. The dynamoelectric machine of claim 6, further comprising:

a plurality of coolant discharge conduits in fluid communication with and electrically insulated from said windings, each of said conduits being in fluid communication with one winding.

* * * * *